(12) United States Patent
Takeda et al.

(10) Patent No.: US 12,464,569 B2
(45) Date of Patent: Nov. 4, 2025

(54) TERMINAL APPARATUS, AND CONTROL METHOD FOR PERFORMING HANDOVER HAVING ENHANCED COMMUNICATION EFFICIENCY

(71) Applicant: KDDI CORPORATION, Tokyo (JP)

(72) Inventors: Hiroki Takeda, Tokyo (JP); Yanwei Li, Tokyo (JP); Jungyeon Hong, Fujimino (JP); Yoshitaka Takaku, Tokyo (JP); Takeo Ohseki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/018,124

(22) Filed: Jan. 13, 2025

(65) Prior Publication Data

US 2025/0151122 A1 May 8, 2025

Related U.S. Application Data

(63) Continuation of application No. PCT/JP2024/003678, filed on Feb. 5, 2024.

(30) Foreign Application Priority Data

Feb. 10, 2023 (JP) ................................. 2023-019287

(51) Int. Cl.
*H04W 74/0833* (2024.01)
*H04W 72/23* (2023.01)
*H04W 76/38* (2018.01)

(52) U.S. Cl.
CPC ....... *H04W 74/0833* (2013.01); *H04W 72/23* (2023.01); *H04W 76/38* (2018.02)

(58) Field of Classification Search
CPC .. H04W 74/0833; H04W 76/38; H04W 72/23
See application file for complete search history.

(56) References Cited

U.S. PATENT DOCUMENTS

2010/0195636 A1 8/2010 Nakashima et al.
2013/0142146 A1 6/2013 Nakashima et al.
(Continued)

FOREIGN PATENT DOCUMENTS

JP 2020-502883 A 1/2020
WO WO-2009/038074 A1 3/2009
(Continued)

OTHER PUBLICATIONS

3GPP TSG-RAN WG2 Meeting #119 Electronic, R2-2209255, Online, Aug. 17-29, 2022.

*Primary Examiner* — Andrew Lee
(74) *Attorney, Agent, or Firm* — Foley & Lardner LLP (57) ABSTRACT

A base station apparatus performs, for a currently connected terminal apparatus, setting of a radio resource control (RRC) layer for another base station apparatus that is a destination candidate for a handover by the terminal apparatus from the base station apparatus, instructs the terminal apparatus to transmit a random access preamble to the other base station apparatus via a physical downlink control channel (PDCCH) order without handover to the other base station apparatus being performed, and transmits, to the terminal apparatus, a command instructing for handover to the other base station apparatus in response to the terminal apparatus being in a state for handover to the other base station apparatus.

13 Claims, 3 Drawing Sheets

(56) References Cited

U.S. PATENT DOCUMENTS

| | | | |
|---|---|---|---|
| 2014/0233492 A1 | 8/2014 | Nakashima et al. | |
| 2018/0176949 A1* | 6/2018 | Islam | H04W 52/146 |
| 2018/0332507 A1 | 11/2018 | Fujishiro et al. | |
| 2019/0110234 A1 | 4/2019 | Peisa et al. | |
| 2019/0306784 A1* | 10/2019 | Chen | H04W 76/15 |
| 2019/0373642 A1 | 12/2019 | Suzuki et al. | |
| 2020/0045743 A1* | 2/2020 | Lee | H04W 74/0833 |
| 2022/0038976 A1* | 2/2022 | Hwang | H04W 36/0079 |
| 2022/0078678 A1* | 3/2022 | Amuru | H04W 36/0058 |
| 2022/0201768 A1* | 6/2022 | Ohara | H04W 74/002 |
| 2023/0199676 A1* | 6/2023 | Palle Venkata | H04W 56/0045 |
| 2024/0147321 A1* | 5/2024 | Zhou | H04W 36/0064 |
| 2024/0259088 A1* | 8/2024 | Rune | H04B 7/18532 |
| 2024/0284373 A1* | 8/2024 | Goyal | H04W 56/0045 |
| 2024/0381411 A1* | 11/2024 | Koskela | H04W 74/006 |
| 2025/0048236 A1* | 2/2025 | Kim | H04W 76/27 |
| 2025/0056348 A1* | 2/2025 | Shih | H04W 56/0015 |

FOREIGN PATENT DOCUMENTS

| | | |
|---|---|---|
| WO | WO-2017/130852 A1 | 8/2017 |
| WO | WO-2018/135640 A1 | 7/2018 |

\* cited by examiner

TERMINAL APPARATUS, AND CONTROL METHOD FOR PERFORMING HANDOVER HAVING ENHANCED COMMUNICATION EFFICIENCY

CROSS-REFERENCE TO RELATED APPLICATION(S)

This application is a continuation of International Patent Application No. PCT/JP2024/003678 filed on Feb. 5, 2024, which claims priority to and the benefit of Japanese Patent Application No. 2023-019287 filed on Feb. 10, 2023, the entire disclosures of which are incorporated herein by reference.

BACKGROUND OF THE INVENTION

Field of the Invention

The present invention relates to handover technology for a cellular communication system.

Description of the Related Art

In a mobile communication system, as a terminal apparatus moves, handover is performed to switch the connection destination cell (base station apparatus) of the terminal apparatus. Typically, after a handover instruction is received from the base station apparatus, the terminal apparatus executes synchronization establishment and setting processing for the cell that is the connection switching destination and executes processing to establish a connection. The processing to switch the connection destination takes a certain amount of time, and while this processing is being executed, the terminal apparatus cannot communicate user data. Regarding this, in the method described in Non-patent Literature 1, before handover is actually performed, a base station apparatus that is the handover source provides a terminal apparatus a communication parameter for radio resource control (RRC) for connecting to another base station apparatus that is the handover destination. Then, the base station apparatus that is the handover source transmits a layer 1 or a layer 2 command instructing to switch cells to the terminal apparatus at the time when handover is to be performed. In response to receiving the command, the terminal apparatus can execute a random access procedure with the base station apparatus that is the handover destination to complete the handover without terrestrial processing on an RRC layer thereafter. With such a technology, degradation of the communication efficiency relating to handover can be reduced.

CITATION LIST

Non-Patent Literature

NPL1: 3GPP (registered trademark) Contribution, R2-2209255

SUMMARY OF THE INVENTION

The present invention provides technology for further enhancing communication efficiency relating to handovers.

A terminal apparatus according to one aspect of the present invention comprises: a receiving unit configured to receive, from a currently connected base station apparatus, a setting of a radio resource control (RRC) layer for another base station apparatus that is a destination candidate for a handover by the terminal apparatus from the base station apparatus and to receive, from the base station apparatus, a physical downlink control channel (PDCCH) order instructing the terminal apparatus to transmit a random access preamble to the other base station apparatus without handover to the other base station apparatus being performed; a transmitting unit configured to transmit the random access preamble to the other base station apparatus according to the instruction; and a performing unit configured to perform handover to the other base station apparatus in a case where a command instructing for a handover to the other base station apparatus is received from the base station apparatus, wherein the receiving unit receives, from the base station apparatus, a sequence unique to the terminal apparatus used by the terminal apparatus when generating the random access preamble and information for identifying radio resources that can be used when transmitting the random access preamble, and the transmitting unit generates the random access preamble using the sequence unique to the terminal apparatus and transmits the random access preamble using radio resources identified via the information, and in a case where a signal requesting for retransmission of the random access preamble is received from the base station apparatus, the transmitting unit retransmits the random access preamble, and in a case where a signal requesting for retransmission of the random access preamble is not received from the base station apparatus or the other base station apparatus, the transmitting unit does not retransmit the random access preamble.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

Figure 1:
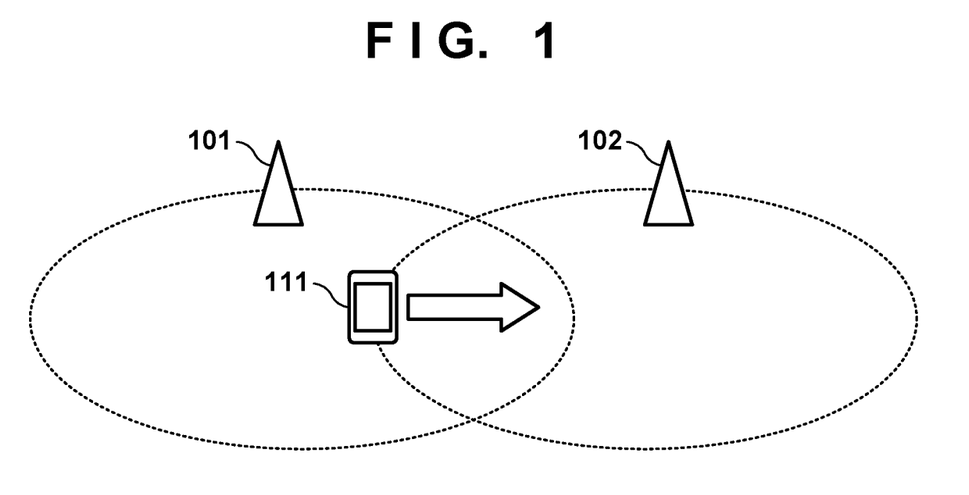
FIG. 1 is a diagram illustrating an example of the configuration of a wireless communication system.

FIG. 1 illustrates an example of the configuration of a wireless communication system according to the present embodiment. The wireless communication system is a cellular communication system configured to be compliant with a cellular communication standard such as the 5th generation (5G) of the 3rd Generation Partnership Project (3GPP (registered trademark)) and subsequent standards. The wireless communication system includes a base station apparatus 101 and a base station apparatus 102 and a terminal apparatus 111. Note that in the example of FIG. 1, only two base station apparatuses and one terminal apparatus are illustrated to simply the description, but naturally more base station apparatuses and terminal apparatuses may exist.

In FIG. 1, the terminal apparatus 111 is moving from within an area of a cell formed by the base station apparatus 101 into an area of a cell formed by the base station apparatus 102. At this time, the terminal apparatus 111 performs a handover for switching the connection destination base station apparatus from the base station apparatus 101 to the base station apparatus 102.

In the present embodiment, the handover process is executed for reducing the time period in which the terminal apparatus 111 cannot communicate user data due to the handover. In other words, the handover source base station apparatus 101 executes setting (setting using an RRC message) for a radio resource control (RRC) layer before handover is actually performed for the terminal apparatus 111. In other words, in a typical handover, the terminal apparatus 111 receives an instruction for a handover from the handover source base station apparatus 101, and at a timing before the handover processing is to be actually performed, the terminal apparatus 111 is notified of the setting for the RRC layer to be performed when the handover processing is started. In the setting here, the terminal apparatus 111 is notified of a communication parameter used in connecting to and communicating with the base station apparatus 102 that is the handover destination candidate. For example, the communication parameter may include a beam setting, a parameter or radio resource (frequency and time resource) to be used when a random access procedure is executed, or the like for the base station apparatus 102 that is the handover destination candidate. Also, the base station apparatus 101 that is the handover source may transmit, to the terminal apparatus 111, a synchronization signal (SS)/physical broadcast channel (PBCH) block (SSB) measurement instruction to be transmitted from the base station apparatus 102 that is the handover destination candidate.

The terminal apparatus 111 measures the SSB sent from the base station apparatus 102 that is the handover destination candidate according to the measurement instruction from the currently connected base station apparatus 101. Then, the terminal apparatus 111 notifies the currently connected base station apparatus 101 of the measurement result. Here, the base station apparatus 101 may notify the measurement target, that is, base station apparatus 102 that is the handover destination candidate, of the measurement result. Accordingly, in a case where the terminal apparatus 111 has actually performed handover, the base station apparatus 102 can identify the general direction of the beam to use in communication with the terminal apparatus 111. Here, to identify a detailed beam to use in downlink, the base station apparatus 102 may notify the terminal apparatus 111 of the transmission setting of the channel state information (CSI)—reference signal (RS). Note that this notification may be performed by the transmission setting of the CSI-RS being sent from the base station apparatus 102 to the base station apparatus 101 and the base station apparatus 101 transferring the transmission setting to the currently connected terminal apparatus 111. When the terminal apparatus 111 receives the transmission setting, the CSI-RS to be transmitted from the base station apparatus 102 is measured according to the information and the currently connected base station apparatus 101 is notified of the measurement result. Then, the base station apparatus 101 transfers the measurement result to the base station apparatus 102. In this manner, the base station apparatus 102 can obtain the measurement result of the CSI-RS for the terminal apparatus 111. As a result, the base station apparatus 102 can determine the detailed beam to be used in downlink communication after the terminal apparatus 111 has performed handover before the handover is actually performed. Accordingly, the processing to determine in detail the direction of the beam after handover has been performed can be omitted, and the time period in which the efficiency of the communication of the user data of the terminal apparatus 111 is degraded can be shortened. For example, the CSI-RS transmission setting described above may be sent to the terminal apparatus 111 using a CSI-RS measurement setting configured of a CSI-RS radio resource setting (CSI-RS-Resource) and a report setting (csi-ReportConfig) relating to the base station apparatus 102 and set in advance before handover as a communication parameter in the terminal apparatus 111. The CSI-RS-Resource includes the time location and frequency location of the radio resource block for transmitting the CSI-RS. For example, by using CSI-RS-Resource id and identifying the CSI-RS-Resource in the medium access control control element (MAC CE) or the downlink control information (DCI), the terminal apparatus 111 may be instructed to measuring the radio resource of a specific CSI-RS. Also, in csi-ReportConfig, the report timing of an aperiodic or periodic CSI report is set. For example, by using csi-ReportConfig id and identifying csi-ReportConfig in the MAC CE or the DCI, the terminal apparatus 111 may be instructed to report the CSI-RS measurement result at a specific timing. Also, when the measurement setting described above is performed for the terminal apparatus 111, the base station apparatus 101 may include which base station apparatus CSI-RS transmission setting it is as information for identifying the terminal apparatus 111, for example, as a cell identifier, in the MAC CE or DCI and transmit this to the terminal apparatus 111.

In the present embodiment, to further reduce the degradation of communication efficiency in handover, the terminal apparatus 111 performs the random access (RA) process before it is determined to perform handover to the base station apparatus 102. In other words, before handover is actually performed, the terminal apparatus 111 may execute processing for uplink synchronization establishment. The base station apparatus 101 that the terminal apparatus 111 is currently connected to transmits an instruction for causing the terminal apparatus 111 to transmit a random access preamble (RA preamble) to the base station apparatus 102. Then, the terminal apparatus 111 transmits the RA preamble using a radio resource prepared for the RA process in the base station apparatus 102 according to the instruction. Note that the radio resource and information of the sequence to be used in generating the RA preamble may be sent from the base station apparatus 101 to the terminal apparatus 111 when the RRC layer setting processing described above is executed, for example. Also, the terminal apparatus 111 may be notified of this information when the RA preamble transmission instruction is sent from the base station apparatus 101. This instruction, for example, may be performed using a PDCCH order, which is a typical process for transmitting the RA preamble from the base station apparatus 101. Note that the PDCCH is a physical downlink control channel. Note that a typical PDCCH order is used to cause the RA preamble to be transmitted from the terminal apparatus 111 to the base station apparatus 101 when the uplink synchronization is off with the base station apparatus 101 that the terminal apparatus 111 is currently connected to. Regarding this, the present embodiment is different in that it is used for transmitting the RA preamble to the base station apparatus 102 that is not connected. According to this process, the RA preamble transmitted from the terminal apparatus 111 is received by the base station apparatus 102. Then, the base station apparatus 102 can determine a timing advance value (TA value) to be used when an uplink signal is transmitted to the base station apparatus 102 by the terminal apparatus 111. Then, the base station apparatus 102, for example, notifies the base station apparatus 101 that the terminal apparatus 111 is currently connected to of the TA value, and the base station apparatus 101 transfers the TA value to the terminal apparatus 111 to notify the terminal apparatus 111 of the TA value. Accordingly, the terminal apparatus 111 can establish an uplink synchronization with the base station apparatus 102 at the time when handover to the base station apparatus 102 is instructed by the base station apparatus 101. Thus, uplink user data can be transmitted to the base station apparatus 102 without performing the RA process again. The RA process via the PDCCH order to be performed according to the present embodiment will be described below in detail.

Thereafter, the base station apparatus 101 may notify the terminal apparatus 111 to perform handover when there is a predetermined trigger such as when the reception quality of a wireless signal from the base station apparatus 101 at the terminal apparatus 111 has degraded a predetermined level from the reception quality of a wireless signal from the base station apparatus 102 or the like. This notification may be performed using a command referred to as a Cell switch command. This command may be transmitted using a medium access control control element (MAC CE) or downlink control information (DCI). Note that the command includes identification information of the cell formed by the base station apparatus 102 that is the handover destination. Also, in a case where a plurality of settings for the RRC layer to be used in communicating with the base station apparatus 102 are set, the command may include an identifier, such as an RRC-TransactionIdentifier, uniquely associated with each setting for the RRC layer. Also, at this time, as described above, the TA value determined at the base station apparatus 102 and sent to the base station apparatus 101 via the RA process performed in advance may be sent from the base station apparatus 101 to the terminal apparatus 111. Also, as described above, information relating to beams determined by the base station apparatus 102 by performing SSB or CSI-RS measurement in advance and sent to the base station apparatus 101 may be sent from the base station apparatus 101 to the terminal apparatus 111. Also, the base station apparatus 102 may reserve uplink radio resources to be used by the terminal apparatus 111 and notify the base station apparatus 101 of the information of the reserved radio resources. Then, the base station apparatus 101 may notify the terminal apparatus 111 of the information of the uplink radio resource in the command described above. Accordingly, after the terminal apparatus 111 receives the command described above, the terminal apparatus 111 can transmit the user data without performing communication for control with the base station apparatus 102 after handover. Note that the uplink user data radio resource may be sent from the base station apparatus 102 to the terminal apparatus 111 after handover. In this case also, by performing the RA process before receiving the command as described above, the RA process after command reception can be omitted. Thus the terminal apparatus 111 can immediately transmit the user data using the specified radio resource. Note that, for example, the base station apparatus 101 before handover can obtain a buffer status report (BSR) from the currently connected terminal apparatus 111 and can notify the handover destination base station apparatus 102 of the contents. Accordingly, the base station apparatus 102 can allocate the appropriate amount of radio resources to the terminal apparatus 111 without receiving a BSR from the terminal apparatus 111. Also, in response to receiving the command described above from the base station apparatus 101, the terminal apparatus 111 may switch the connection destination to the base station apparatus 102 and transmit a scheduling request (SR) to the base station apparatus 102.

Note that in a case where the terminal apparatus 111 receives a command via MAC CE as described above, the terminal apparatus 111 may transmit an acknowledgement (Ack) or the like to the base station apparatus 101. Also, in a case where the terminal apparatus 111 receives the command described above, the terminal apparatus 111 may switch the connection destination to the base station apparatus 102 and transmit an Ack or the like to the base station apparatus 102. In this case, the terminal apparatus 111 may transmit the Ack to the base station apparatus 102 using the uplink radio resource allocated as described above. Also, the base station apparatus 102 may transfer the acknowledgement to the base station apparatus 101. In this manner, the base station apparatus 101 can determine that the terminal apparatus 111 has switched the connection destination to the base station apparatus 102 and can discard the context information of the terminal apparatus 111, for example. Note that in a case where the base station apparatus 101 has not received an Ack from the terminal apparatus 111, the command described above may be resent and handover may be assuredly performed. Also, in a case where the terminal apparatus 111 receives a command via DCI as described above, the terminal apparatus 111 may transmit a predetermined signal such as an SR or a BSR to the handover destination base station apparatus 102 to implicitly notify the base station apparatus 102 that the command has been received. Note that the terminal apparatus 111 may be notified of the uplink radio resource of the base station apparatus 102 for transmitting the SR or the BSR using the DCI of the command via the base station apparatus 101. Note that, for example, the predetermined signal such as the BSR or the like may be transmitted using a dedicated MAC CE indicating that handover has been performed based on the command described above and may be transmitted in a similar manner as with a typical BSR. Also, separate from an SR, BSR, or the like, the base station apparatus 102 may be notified of a dedicated MAC CE indicating that handover based on the command described above has been performed.

Note that whether or not the handover of the terminal apparatus 111 has been successful may be able to be determined using a timer. The terminal apparatus 111 starts measuring a predetermined time period with a first timer when the command described above is received. Note that after the start of the time measuring by the first timer, the terminal apparatus 111 may receive a PDCCH from the base station apparatus 101 in parallel with receiving a PDCCH from the base station apparatus 102. In other words, the terminal apparatus 111 may be able to receive both the command described above retransmitted from the base station apparatus 101 and a predetermined signal transmitted from the base station apparatus 102 upon a successful handover. For example, the terminal apparatus 111 may continuously observe the PDCCH from both the base station apparatuses while switching between receiving a signal of the base station apparatus 101 and receiving a signal of the base station apparatus 102 in a time-divisional manner. Also, for example, after receiving a command, the terminal apparatus 111 may transmit a response signal such as the Ack described above to the base station apparatus 102 and may start a second timer. Note that the second timer measures an amount of time smaller than the amount of time set for the first timer. Also, the response signal, for example, may be a signal different from an Ack such as a Cell switch command response or the like. For example, in a case where a negative response (Nack) indicating that a response signal retransmission instruction or a response signal could not be received from the base station apparatus 102 was not received in the time until the second timer ends, the terminal apparatus 111 may determine that handover has been successful. In a case where a retransmission instruction or a Nack is received, the terminal apparatus 111 may retransmit the response signal, reset the second timer, and start measuring time again. Note that in a case where a retransmission instruction or a Nack is received after the first timer ends, the terminal apparatus 111 may determine that handover has failed.

Also, in another example, in a case where the second timer is not used and a predetermined signal is received from the base station apparatus 102 while the first timer is active, the terminal apparatus 111 may determine that handover has been successful. In this case, the terminal apparatus 111 may stop the first timer in response to the predetermined signal being received. Here, the predetermined signal from the base station apparatus 102 may be a signal instructing to end reception of the PDCCH transmitted from the base station apparatus 101, for example. Also, the predetermined signal from the base station apparatus 102 may be an acknowledgement (Ack) for the response signal described above. In response to the predetermined signal being received, the terminal apparatus 111 may end reception of the PDCCH transmitted from the base station apparatus 101 and continue reception of the PDCCH from the base station apparatus 102. On the other hand, in a case where a retransmission request or Nack relating to the response signal is received before the first timer ends, the terminal apparatus 111 may retransmit the response signal to the base station apparatus 102. Also, in a case where, irrespective of whether there is a first timer or not, a third time is activated when a response signal is transmitted and the predetermined signal described above is not received before the third timer ends, the terminal apparatus 111 may determine that the base station apparatus 102 has not been successful in receiving the response signal. In this case, if the first timer has not ended, the terminal apparatus 111 retransmits the response signal and resets the third timer. If the first timer has ended, the terminal apparatus 111 may determine that handover has failed. Also, the terminal apparatus 111 may put a limit on the number of retransmissions of the response signal described above. In this case, the terminal apparatus 111 may determine that handover has failed in response to the number of retransmissions of the response signal reaching the predetermined number.

Note that in a case where the terminal apparatus 111 determines that handover has failed, the terminal apparatus 111 may end reception of the PDCCH of the base station apparatus 102 and continue reception of the PDCCH of the base station apparatus 101. Also, in this case, the terminal apparatus 111 may notify the base station apparatus 101 that handover has failed. In a case where the base station apparatus 102 receives a response signal from the terminal apparatus 111, the base station apparatus 102 may determine that handover has been successful and may notify the base station apparatus 101 that handover has been successful. The base station apparatus 101 may delete the context information of the terminal apparatus 111 on the basis of this notification.

Also, in response to a Cell switch command being received, the terminal apparatus 111 may end reception of the PDCCH from the base station apparatus 101. In this case, if the terminal apparatus 111 determines that handover to the base station apparatus 102 has failed, the terminal apparatus 111 may execute reconnection processing.

The terminal apparatus 111 may be notified of the information of the duration of time measuring with the timer described above and the maximum value for the number of retransmissions of the response signal at the time of the RRC layer setting processing described above, for example. Note that in a case where there are a plurality of cells that are handover destination candidates, the terminal apparatus 111 may be notified of the information of the timer value and the maximum value for the number of retransmissions and the like for each individual cell of the plurality of cells. Also, at least a portion of the plurality of cells may be grouped, and the terminal apparatus 111 may be notified of the common setting information for each group. Furthermore, the terminal apparatus 111 may be notified of common setting information for all of the cells. Also, the terminal apparatus 111 may be notified of this setting information via the Cell switch command, for example. Note that to transmit the response signal described above, uplink radio resource allocation is performed. However, the terminal apparatus 111 may be notified of the information of the maximum value for the number of retransmissions in the uplink cloud indicating the allocation.

As described above, the terminal apparatus 111 can shorten the time period in which user data cannot be communicated when a handover is performed from the base station apparatus 101 to the base station apparatus 102. Accordingly, a communication service with low latency and high reliability can be provided, for example. Also, by shortening the time period in which user data cannot be communicated, degradation of the wireless communication efficiency can be reduced.

(RA Process Based on PDCCH Order)

Processing Example 1

The RA process based on the PDCCH order execute according to the present embodiment will now be described in more detail. For example, an example in which a unique sequence of when the RA preamble is generated is allocated to the terminal apparatus 111 will be described. First, the base station apparatus 101 notifies the base station apparatus 102 that the terminal apparatus 111 is to start the RA process. Accordingly, the base station apparatus 101 that the terminal apparatus 111 is currently connected to and the base station apparatus 102 that is the handover destination candidate can both be made aware that the RA process is to be executed by the terminal apparatus 111. Then, the base station apparatus 101 instructs the terminal apparatus 111 to execute the RA process using a PDCCH as described above. At this time, for example, the terminal apparatus 111 may be notified by the base station apparatus 101 of information for identifying the radio resource (frequency and time resource) such as a the SS/PBCH index and the PRACH Mask index set by the base station apparatus 102 for receiving the RA preamble by the base station apparatus 102 and the information (Random Access Preamble Index) indicating the sequence of the RA preamble to be used. Note that in a case where there are a plurality of cells that are handover destination candidates, the terminal apparatus 111 may be collectively notified of the information of the plurality of cells by the base station apparatus 101 using one PDCCH. Also, the terminal apparatus 111 may be notified of the information of at least a portion of the plurality of cells by the base station apparatus 101 using separate PDCCHs. Note that as described above, the sequence of the RA preamble here may be allocated separately for the terminal apparatus 111. Thus, the terminal apparatus 111 may be notified of information indicating one sequence for each cell that is a handover destination candidate. Accordingly, in a case where the RA preamble of the corresponding sequence is received, the base station apparatus that is the handover destination candidate can uniquely identify that the transmission source of the RA preamble is the terminal apparatus 111. On the basis of the information received from the base station apparatus 101, for the cells that are the handover destination candidates, the terminal apparatus 111 transmits the RA preamble using the specified sequence using the radio resource corresponding to the cell. For example, the terminal apparatus 111 is notified of the radio resources allowed by the transmission of the RA preamble by the base station apparatus 102 and the sequence to be used by the terminal apparatus 111 by the base station apparatus 101. Then, the terminal apparatus 111 transmits the RA preamble to the base station apparatus 102 using the sequence notified by the base station apparatus 101 using the radio resources notified by the base station apparatus 101. The base station apparatus 102 that is the handover destination candidate executes RA preamble detection processing using the sequence specified for the terminal apparatus 111 using the radio resources for RA process and determines whether or not the RA preamble has been received from the terminal apparatus 111.

Note that at this time, the terminal apparatus 111 may not be notified of the TA value, and there is no need to perform contention resolution by the sequence for the RA preamble unique to the terminal apparatus 111 being specified. Thus, the base station apparatus 102 may not send back an RA response to the terminal apparatus 111. However, on the basis of the timing of the reception of the RA preamble, the base station apparatus 102 can determine the TA value to be used by the terminal apparatus 111. Then, the TA value can be sent from the base station apparatus 102 to the base station apparatus 101, for example. The base station apparatus 101 may notify the terminal apparatus 111 of the information of the value together with the command described below, for example. Note that in a case where the RA response is not transmitted, the terminal apparatus 111 cannot recognize whether the RA preamble has been received as normal. Thus, in the present processing example, in a case where the RA preamble could not be received from the terminal apparatus 111 within a predetermined time period, the base station apparatus 102 may retransmit the RA preamble to the terminal apparatus 111 via the base station apparatus 101. For example, the base station apparatus 102 may sent a predetermined notification indicating that the RA preamble could not be received from the terminal apparatus 111 to the base station apparatus 101. In a case where the predetermined notification is received, the base station apparatus 101 transmits the PDCCH order again to the terminal apparatus 111 and retransmits the RA preamble. In a case where the PDCCH order is received again, the terminal apparatus 111 retransmits the RA preamble. On the other hand, while the PDCCH order has not been received again, the terminal apparatus 111 may be configured to not retransmit the RA preamble. In other words, in the present processing example, the terminal apparatus 111 may be configured to not retransmit the RA preamble while there has been no special instruction.

Note that in the example described above, the base station apparatus 102 does not transmit an RA response. However, the base station apparatus 102 may transmit an RA response. In this case, the terminal apparatus 111 can obtain the TA value via the RA response. Also, in response to an RA response not being received, the terminal apparatus 111 may voluntarily retransmit the RA preamble. Note that in a case where the RA response is received, the terminal apparatus 111 does not execute the processing subsequent to the RA process (processing after message 3 in the RA process). In other words, the terminal apparatus 111 may obtain the TA value via the RA response and may end the RA process without executing the subsequent processing. Also, the base station apparatus 102 does not include the allocation of radio resources for the message 3 in the RA response. In other words, in the typical RA process, the uplink radio resources for transmitting the message 3 is specified in the RA response. However, since there is no need to transmit the message 3, radio resources for this do not need to be specified.

Note that in the processing example described above, in a case where there is no retransmission instruction for the RA preamble from the base station apparatus 101 or the base station apparatus 102, the terminal apparatus 111 does not retransmit the RA preamble. However, no such limitation is intended. For example, the terminal apparatus 111 may retransmit the RA preamble at predetermined periods, and unless an instruction to stop transmission of the RA preamble is received from the base station apparatus 101 or the base station apparatus 102, the RA preamble is repeatedly transmitted at the predetermined periods. For example, in a case where the RA preamble is detected as normal at the base station apparatus 102, a predetermined time period has elapsed, or the like, and it is determined to stop transmission of the RA preamble by the terminal apparatus 111, the base station apparatus 101 or the base station apparatus 102 may transmit an RA preamble transmission stop instruction to the terminal apparatus 111.

Processing Example 2

In processing example 1, the sequence of the RA preamble unique to the terminal apparatus 111 is specified. However, no such limitation is intended. In another processing example, the terminal apparatus 111 transmits the RA preamble using one sequence selected from a group of sequences used in the contention-based RA process for a cell that is a handover destination candidate. The base station apparatus 101 obtains an SSB measurement result for the cell that is a handover destination candidate from the terminal apparatus 111 as described above and selects the cell to cause the terminal apparatus 111 to perform the RA process for on the basis of this measurement result. For example, the base station apparatus 101 may select a cell with a wireless quality equal to or greater than a predetermined level as the cell to perform the RA process for. Also, the base station apparatus 101 may select a predetermined number of one or more of cells in order from the best wireless quality as the cells to perform the RA process for. Then, the base station apparatus 101 notifies the terminal apparatus 111 of the SSB index corresponding to the selected cell. On the basis of the SSB index, the terminal apparatus 111 can identify the radio resources (frequency and time resource) for transmitting the RA preamble. Here, the base station apparatus 102 may specify a Cell-Radio Network Temporary Identifier (C-RNTI) for RA process communication and post-contention-resolution communication and may notify the terminal apparatus 111 of the C-RNTI via the base station apparatus 101. Also, instead of the C-RNTI, the terminal apparatus 111 may be notified of a temporary identifier (Temporary C-RNTI (TC-RNTI)).

Thereafter, the terminal apparatus 111 transmits the RA preamble. For example, the terminal apparatus 111 selects one sequence from among the group of sequences corresponding to the notified SSB index, generates an RA preamble, and transmits the RA preamble using the radio resources corresponding to the SSB index. Here, the terminal apparatus 111 selects one sequence from among a group of sequences that can access the base station apparatus 102 and transmits the RA preamble generated using the selected sequence using the radio resources for the RA process of the base station apparatus 102. The group of sequences that can be used to generate the RA preamble here can also be used by other terminal apparatuses, and the base station apparatus 102 cannot recognize whether the RA preamble from the terminal apparatus 111 has been received from just the detection of the RA preamble. Thus, in a case where the RA preamble is detected, for subsequent contention resolution, the base station apparatus 102 transmits the RA response. After the RA preamble is transmitted, the terminal apparatus 111 activates a timer (ra-ResponseWindow) for measuring a certain time period for detecting the RA response. In a case where an RA response is received in the certain time period, the terminal apparatus 111 stops retransmission of the RA preamble. In a case where an RA response is not received in the certain time period, the terminal apparatus 111 retransmits the RA preamble and resets and restarts the timer. For example, the maximum number of retransmissions of the RA preamble is specified by a signal transmitted from the base station apparatus 101 or the base station apparatus 102. Note that as described above, the terminal apparatus 111 may be notified of the identification information (C-RNTI, TC-RNTI, or the like) of the terminal apparatus 111 from the base station apparatus 101. However, instead of this notification, the terminal apparatus 111 may be notified of the TC-RNTI by the base station apparatus 102 via an RA response. Note that the resource allocation of the frequency domain and the time domain of the physical downlink shared channel (PDSCH) for transmitting the RA response can be identified by the UE using Random Access (RA)-RNTI. In other words, the resource allocation is specified by a DCI format 1_0 with CRC scrambled by RA-RNTI transmitted by the base station apparatus 102, and the terminal apparatus 111 can obtain this information using the RA-RNTI. Note that the RA-RNTI is identified on the basis of the position of the radio resource (time position and frequency position identified by signal, slot, or frame) used in transmission of the RA preamble. Then, the terminal apparatus 111 receives the RA response corresponding to the RA preamble transmitted by the terminal apparatus 111 according to the resource allocation obtained using the RA-RNTI.

When the RA response is received, the terminal apparatus 111 transmits the message 3 of the RACH process to the base station apparatus 102 using the uplink radio resources specified in the RA response. Here, the terminal apparatus 111 receives the TA value to be used with the RA response and controls the transmission timing of the message 3 using the TA value. Note that at this point in time, it is not confirmed whether the TA value is a TA value for the terminal apparatus 111. In other words, another terminal apparatus that receives the RA preamble with the same sub-frame and frequency position may also identify the same RA-RNTI and receive the RA response. Thus, the TA value obtained by the terminal apparatus 111 is not confirmed to be the value determined on the basis of the RA preamble transmitted by the terminal apparatus 111 at this point in time. In a case where the C-RNTI is used for resolution of this situation (in other words, contention resolution), the terminal apparatus 111 transmits the identification information (C-RNTI) of the terminal apparatus 111 notified as described above via the message 3 to the base station apparatus 102. Also, the terminal apparatus 111 activates a timer (ra-Contention-ResolutionTimer) for measuring a certain time period for determining whether or not contention resolution at the base station apparatus 102 has been successful. In a case where the terminal apparatus 111 receives a DCI addressed to the identification information (C-RNTI) of the terminal apparatus 111 before the certain time period ends, the terminal apparatus 111 can identify that the TA value has been set on the basis of the RA preamble transmitted by the terminal apparatus 111. In the case of using TC-RNTI, the terminal apparatus 111 transmits the identification information (for example, InitialUE-Identity configured of 5G-S-TMSI and a random number) of the terminal apparatus 111 via the message 3 to the base station apparatus 102. Thereafter, the terminal apparatus 111 activates a timer (ra-Contention-ResolutionTimer) for measuring a certain time period for determining whether or not contention resolution at the base station apparatus 102 has been successful. In a case where a message 4 instructing to transmit using DCI addressed to the identification information (TC-RNTI) of the terminal apparatus 111 before the certain time period ends includes the identification information (for example, InitialUE-Identity) of the terminal apparatus 111 transmitted to the base station apparatus 102 via the message 3, the terminal apparatus 111 can identify that the TA value has been set on the basis of the RA preamble transmitted by the terminal apparatus 111. Note that here, only the TA value is confirmed (uplink synchronization establishment has been performed), and the connection between the terminal apparatus 111 and the base station apparatus 102 has not been confirmed. On the other hand, in a case where the terminal apparatus 111 has not received a DCI addressed to the identification information (C-RNTI or TC-RNTI) of the terminal apparatus 111 within the certain time period described above, the TA value obtained using the RA response is not a TA value based on the RA preamble transmitted by the terminal apparatus 111. Thus, the terminal apparatus 111 retransmits the RA preamble.

Note that the signal transmitted from the base station apparatus 102 to the terminal apparatus 111 described above may be sent to the terminal apparatus 111 via the base station apparatus 101. In this case, the base station apparatus 102 transmits the content of a message 2 (RA response) and the message 4, for example, to the base station apparatus 101 using an inter-base-station interface, and the base station apparatus 101 notifies the terminal apparatus 111 of the information corresponding to the messages. As described above, in a case where a wireless signal is directly transmitted from the base station apparatus 102 to the terminal apparatus 111, the terminal apparatus 111 continues reception of the PDCCH of the base station apparatus 101 and does not need to execute processing to receive the message 2 and the message 4 from the base station apparatus 102.

Regarding this, in a case where the terminal apparatus 111 is notified of the message 2 and the message 4 via the base station apparatus 101, the terminal apparatus 111 does not need to receive a wireless signal from the base station apparatus 102. Note that only one of the message 2 and the message 4 may be sent to the terminal apparatus 111 via the base station apparatus 101.

Note that in a case where the terminal apparatus 111 needs to receive a signal of the cell that is the handover destination candidate, the base station apparatus 101 may notify the terminal apparatus 111 of the timing to receive the downlink signal (for example, PDCCH) from the base station apparatus of the candidate cell. For example, in a case where the message 2 and the message 4 described above are directly transmitted from the base station apparatus 102 to the terminal apparatus 111, the terminal apparatus 111 needs to receive a signal such as the PDCCH from the base station apparatus 102. In this case, the base station apparatus 101 may notify the terminal apparatus 111 of the information of the timing of transmitting a signal such as the PDCCH at the base station apparatus 102. Note that there are a plurality of candidate cells, and the base station apparatus 101 may notify the base station apparatus of the candidate cells of a change to the reception timing so that the timing of the PDCCH of the cells does not overlap. Note that in a case where there are a plurality of candidate cells and the timing of the PDCCH of the cells overlaps, the terminal apparatus 111 may notify the base station apparatus 101 of the information of the cells which have overlapping reception timing. After transmission of the RA preamble, triggered by activation of ra-ResponseWindow, for example, the terminal apparatus 111 starts reception of the PDCCH for the cells that are candidates for the transmission destination of the RA preamble. Note that at this time, the terminal apparatus 111 may continue reception of the PDCCH of the currently connected base station apparatus 101 and be in a state of receiving in parallel the PDCCH from a plurality of base station apparatuses. Thereafter, triggered by the end of ra-Response Window, for example, the terminal apparatus 111 may end reception of the PDCCH of the candidate cells. Also, the terminal apparatus 111 may end reception of the PDCCH via an instruction from the candidate cell base station apparatus (for example, the base station apparatus 102) or the base station apparatus 101. Note that the instruction from the candidate cell base station apparatus may be directly transmitted from the base station apparatus to the terminal apparatus 111 or may be transmitted via the base station apparatus 101.

Note that in the processing example described above, the terminal apparatus 111 stops transmission of the RA preamble upon the timer ending without the RA response being received. However, no such limitation is intended. For example, in a case where the terminal apparatus 111 repeatedly transmits the RA preamble at predetermined periods and an RA preamble transmission stop instruction is received from the base station apparatus 101 or the base station apparatus 102, transmission of the RA preamble may be stopped. Note that the transmission stop instruction may be a signal that is different from the RA response. For example, in a case where the terminal apparatus 111 determines to stop transmission of the RA preamble due to a predetermined time period elapsing or the like, the base station apparatus 101 or the base station apparatus 102 may transmit an RA preamble transmission stop instruction to the terminal apparatus 111. Accordingly, transmission of the RA preamble can be instructed to stop by control on the network side.

Handling of Obtained TA Value

Note that the TA value to be used when the terminal apparatus 111 transmits a signal to the base station apparatus 102 is held in at least one of the terminal apparatus 111 or the base station apparatus 102 via the processing described above. However, when a certain amount of time elapses, it can be expected that the TA value ceases being suitable for the real environment. Thus, in the present processing example, how the obtained TA value is handled, for example, using methods to retain an appropriate value for the TA value or ending the retainment of the TA value, will be described.

In the first example, the effective period and update period of the TA value is managed using a timer. For example, the terminal apparatus 111 starts a predetermined timer in response to the TA value of a candidate cell being obtained from either the base station apparatus 101 or the base station apparatus 102 that is a handover destination candidate. Also, in response to the predetermined timer ending, the terminal apparatus 111 performs the process described above again to transmit the RA preamble again and obtain a post-update TA value. Also, either the base station apparatus 101 the terminal apparatus 111 is currently connected to or the base station apparatus 102 that is a handover destination candidate starts the predetermined timer in response to the TA value being determined in the base station apparatus 102. Then, in response to the predetermined timer ending, the base station apparatus managing the timer may instruct the terminal apparatus 111 to perform the RA process described above. For example, in a case where the base station apparatus 101 manages the timer, the base station apparatus 101 may transmit the PDCCH order again so that the processing described above is executed again. Also, in a case where the base station apparatus 102 manages the timer, the base station apparatus 102 may transmit a message requesting that the base station apparatus 101 transmits the PDCCH order to the terminal apparatus 111. Also, in a case where the terminal apparatus 111 continues reception of a signal from the base station apparatus 102, the base station apparatus 102 may directly instruct the terminal apparatus 111 to perform the RA process.

Note that the terminal apparatus 111 may not execute the RA process again and may transmit a predetermined signal such as a sounding reference signal (SRS) or the like. In other words, by a predetermined uplink wireless signal being received at the base station apparatus 102, the base station apparatus 102 can update to an appropriate TA value. Thus, for example, at a predetermined timing such as when a predetermined timer managed in the terminal apparatus 111 ends, the terminal apparatus 111 may transmit the predetermined uplink signal using the TA value set relating to the base station apparatus 102. Note that, for example, the terminal apparatus 111 may transmit an SR and receive allocation of radio resources for transmitting a predetermined signal to the base station apparatus 102. Also, in response to an uplink signal transmission instruction for updating the TA value being received from the base station apparatus 101 or the base station apparatus 102, the terminal apparatus 111 may transmit the predetermined uplink signal. For example, in response to the transmission start instruction from the base station apparatus 102, the terminal apparatus 111 may aperiodically or periodically transmit a predetermined signal such as an SRS. Note that the predetermined signal such as an SRS may be transmitted at a timing based on the pre-update TA value. Also, during periodic transmission of the predetermined signal, the terminal apparatus 111 may stop the periodic transmission of the predetermined signal in response to a transmission stop instruction for the predetermined signal being received from the base station apparatus 102. Also, in another example, in response to an RA response being received from the base station apparatus 102 without an explicit instruction from the base station apparatus 102, the terminal apparatus 111 may periodically transmit the predetermined signal such as an SRS. Note that in a case where the terminal apparatus 111 needs to receive an instruction from the base station apparatus 102, the terminal apparatus 111 may continue reception of the signal such as a PDCCH from the base station apparatus 102 after the RA process described above is performed and the TA value is obtained. Also, the transmit and stop instruction for the predetermined signal and the predetermined signal transmission trigger may be provided by the base station apparatus 101.

Note that in a case where the terminal apparatus 111 continues measuring the wireless quality of the cell that is a handover destination candidate and the wireless quality degrades to a predetermined level or lower, for example, retaining the TA value relating to the cell may be ended. Note that ending the retaining of the TA value may be determined by the terminal apparatus 111 or may be determined by the base station apparatus 101 that received the wireless quality report, with an instruction then being sent to the terminal apparatus 111. Also, the base station apparatus 102 may measure the wireless quality of the predetermined signal described above from the terminal apparatus 111 and may determine to end the retaining of the TA value according to the result. In this case, if the terminal apparatus 111 is retaining the TA value, the base station apparatus 102 may instruct the terminal apparatus 111 to discard the TA value. In a case where retaining the TA value is ended and the timer for retaining the TA value described above is still active, the terminal apparatus 111 or the base station apparatus 101 or the base station apparatus 102 stops the timer. Also, after the timer for retaining the TA value described above has ended, the terminal apparatus 111 or the base station apparatus 101 or the base station apparatus 102 may not restart a similar timer. Also, in a case where the terminal apparatus 111 continues reception of a signal such as a PDCCH or the like from the base station apparatus 102 for retaining the TA value, the terminal apparatus 111 may end reception of the signal. Note that ending reception of the signal from the base station apparatus 102 may be instructed from the base station apparatus 101 or the base station apparatus 102 to the terminal apparatus 111.

Note that as described above, the terminal apparatus 111 may perform handover and connect to the base station apparatus 102 in response to receiving a Cell switch command from the base station apparatus 101. In this case, the connection between the terminal apparatus 111 and the base station apparatus 101 is disconnected. After the disconnection, the base station apparatus 101 may be set as a base station apparatus that is a handover destination candidate of the terminal apparatus 111. The terminal apparatus 111, for example, may retain the TA value of the base station apparatus 101 while connected to the base station apparatus 102. Also, while connected to the base station apparatus 102, the terminal apparatus 111 may continue reception of the predetermined signal (PDCCH or the like) from the base station apparatus 101 in order to retain the TA value of the base station apparatus 101. Accordingly, in a case where the terminal apparatus performs handover repeatedly between a plurality of base station apparatuses or the like, unnecessarily performing the RA process and the like can be prevented, allowing for more efficient communication.

Apparatus Configuration

Figure 2:
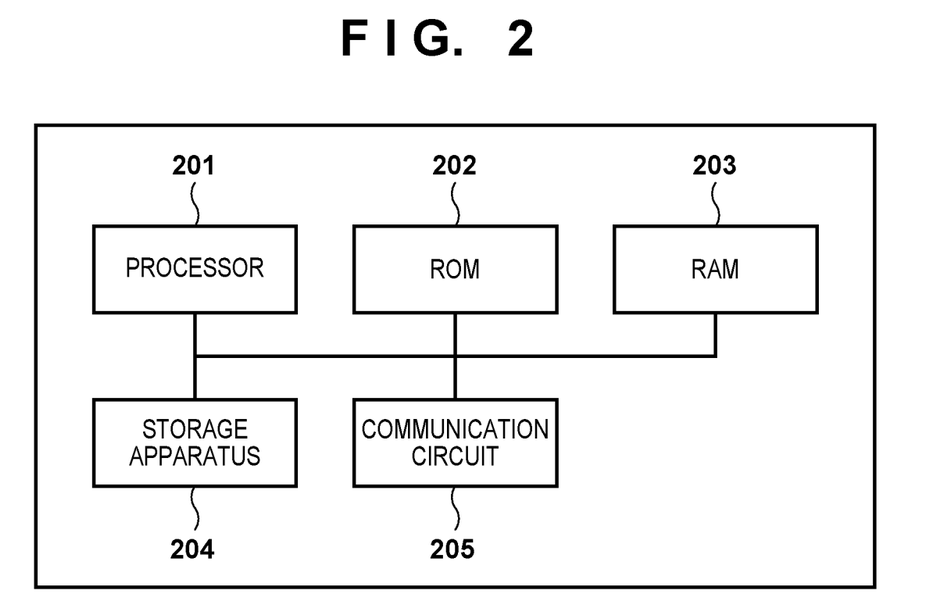
FIG. 2 is a diagram illustrating an example of the hardware configuration of an apparatus.

Next, the apparatus configuration will be described. FIG. 2 is an example of the hardware configuration of a base station apparatus and a terminal apparatus according to the present embodiment. The base station apparatus and the terminal apparatus include, for example, a processor 201, ROM 202, RAM 203, a storage apparatus 204, and a communication circuit 205. The processor 201 is a computer, such as a general-purpose central processing unit (CPU), an application specific integrated circuit (ASIC), or the like, including one or more processing circuits. By the processor 201 reading out and executing a program stored in the ROM 202 and the storage apparatus 204, the processing of the entire apparatus and the processing described above are executed. The ROM 202 is read-only memory that stores information, such as a program relating to processing executed by the base station apparatus and the terminal apparatus, various parameters, and the like. The RAM 203 is random-access memory that functions as a work space when the processor 201 executes a program and temporarily stores information. The storage apparatus 204 is constituted by a detachable external storage device, for example. The communication circuit 205 is constituted by a circuit for 5G wireless communication or successive standards, for example. Note that in FIG. 2, only the single communication circuit 205 is illustrated, but the base station apparatus and the terminal apparatus may include a plurality of communication circuits. For example, the base station apparatus and the terminal apparatus may include a wireless communication circuit for 5G and for successive standards and an antenna shared by the circuits. Note that the base station apparatus and the terminal apparatus may separately include an antenna appropriate for each standard. Also, the base station apparatus may further include a wired communication circuit used when communicating with another base station apparatus or a core network node. Also, the terminal apparatus may further include a communication circuit or the like compliant with a wireless communication standard other than cellular communication standards such as wireless local area network (LAN) and Bluetooth (registered trademark). Note that the base station apparatus and the terminal apparatus may include separate communication circuits 205 for a plurality of usable frequency bands or may include common communication circuits 205 shared by two or more of the frequency bands.

Figure 3:
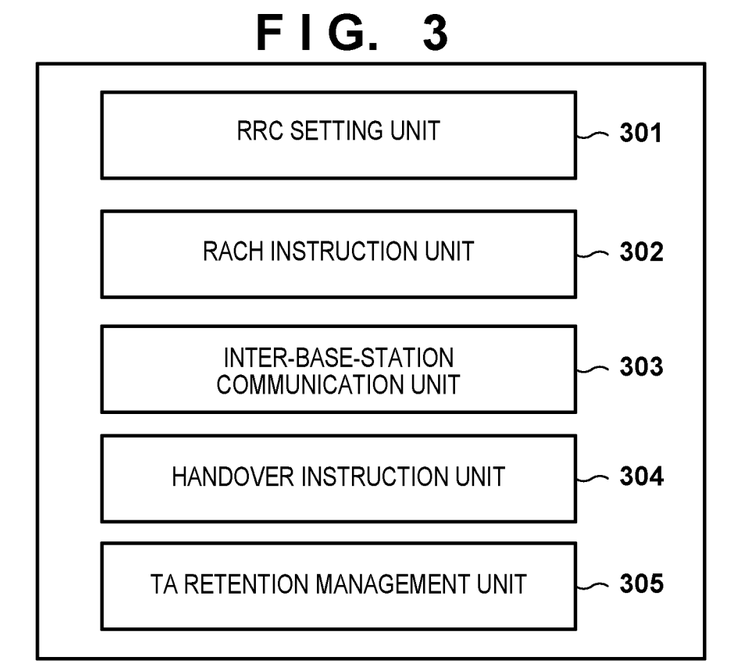
FIG. 3 is a diagram illustrating an example of the functional configuration of a base station apparatus.

FIG. 3 illustrates an example of the functional configuration of the base station apparatus. The base station apparatus includes, for example, an RRC setting unit 301, an RACH instruction unit 302, an inter-base-station communication unit 303, a handover instruction unit 304, and a TA retention management unit 305. Note that in FIG. 3, mainly the functions of the base station apparatus 101 that the terminal apparatus 111 is currently connected to are illustrated. The base station apparatus 102 that is a handover destination candidate is similar to a typical base station apparatus except in that a portion of the signals of the RA process are not transmitted and a portion of the signals are transmitted to the base station apparatus 101. Thus, the base station apparatus 102 will not be illustrated here. Also, in FIG. 3, only the functions relating specifically to the present embodiment are illustrated, and various other functions that the base station apparatus may include are omitted from the diagram. For example, the base station apparatus naturally includes other functions typically included in a base station apparatus compliant with 5G or a successive standard. Also, the functional blocks in FIG. 3 are schematically illustrated, and the functional blocks may be integrally formed or may be subdivided when implemented. Also, the functions in FIG. 3 may be implemented by the processor 201 executing a program stored in the ROM 202 or the storage apparatus 204 or may be implemented by a processor inside the communication circuit 205 executing a predetermined piece of software, for example. Note that the processing executed by the functional units described above will not be described here, and the functions will be described here in broad terms.

The RRC setting unit 301 performs RRC layer setting for the currently connected terminal apparatus, for example. For example, the RRC setting unit 301 transmits a handover request to another base station apparatus that is a handover destination candidate providing the adjacent cell, obtains the communication setting information from the other base station apparatus, and notifies the terminal apparatus of the communication setting information via an RRC layer message. The RRC layer message is an RRC Reconfiguration message. Then, the RRC setting unit 301 performs connection processing setting between the terminal apparatus and the other base station apparatus by receiving an RRC Reconfiguration Complete message from the terminal apparatus. The RACH instruction unit 302 instructs the terminal apparatus that has completed RRC layer setting to transmit the RA preamble to the other base station apparatus that is a handover destination candidate. Here, the RA preamble transmission instruction may include a sequence for generating an RA preamble unique to the terminal apparatus and a group of sequences that can also be used by other terminal apparatuses trying to connect to the other base station apparatus or may include information of the radio resources to be used to transmit the RA preamble. For example, the RACH instruction unit 302 may instruct the currently connected terminal apparatus to transmit the RA preamble to the base station apparatus that is a handover destination candidate via a physical downlink control channel (PDCCH) order. Also, in a case where the RACH instruction unit 302 is configured to instruct the terminal apparatus to retransmit the RA preamble or to repeatedly transmit the RA preamble, the RACH instruction unit 302 may transmit an RA preamble transmission stop instruction to the terminal apparatus as necessary.

The inter-base-station communication unit 303 performs communication between the base station apparatuses that are handover destination candidates. For example, the inter-base-station communication unit 303 may notify the other base station apparatuses that are RA preamble transmission destinations of causing the currently connected terminal apparatus to transmit the RA preamble. Also, the inter-base-station communication unit 303 is used to receive information for the RA process at the base station apparatus that is a handover destination candidate, for example. Also, the inter-base-station communication unit 303 may receive a message (the message 2 or the message 4) to be transmitted to the terminal apparatus from the base station apparatus that is a handover destination candidate in the RA process, for example. Also, the TA value calculated in the base station apparatus that is a handover destination candidate may be obtained via the inter-base-station communication unit 303. Note that a signal received at the inter-base-station communication unit 303 may be transferred to the terminal apparatus via the RACH instruction unit or the like.

In a case where the reception quality of the wireless signal from the other base station apparatus that is a handover destination for the terminal apparatus is higher than the wireless quality between itself and the terminal apparatus by a predetermined level or greater, for example, in response to the terminal apparatus being now in a state to perform handover, the handover instruction unit 304 instructs the terminal apparatus to perform handover. For example, the handover instruction unit 304 transmits a Cell switch command including a cell identifier that can identify the base station apparatus that is the handover destination or the like to the terminal apparatus. Note that in a case where the TA value to be used in uplink communication by the terminal apparatus transmitting the RA preamble or the like is determined, the TA value may be included in the command transmitted to the terminal apparatus. Accordingly, the terminal apparatus can transmit an uplink user data signal using the TA value directly after handover. Also, in the present embodiment described above, the handover instruction unit 304 transmits the command described above after the RA process is performed by the terminal apparatus. However, for example, the command described above may be transmitted before the RA process is performed in some cases in response to an uplink communication delay request for the terminal apparatus, for example. In other words, the RA process may be performed before the exchange of a handover command or may be performed after the exchange of the command.

The TA retention management unit 305 manages the TA value to be used in a case where the terminal apparatus transmits an uplink signal to the base station apparatus that is a handover destination candidate. The TA retention management unit 305 may set the effective period and update period of the TA value and may retransmit the RA preamble to the terminal apparatus, for example, so that the TA value is updated when the effective period ends or the update period arrives. Also, the TA retention management unit 305 may notify the terminal apparatus of the SRS setting for the base station apparatus that is a handover destination and may update the TA value by transmitting the SRS to the terminal apparatus using the SRS setting. Note that the base station apparatus that is a handover destination may include the TA retention management unit 305, or the base station apparatus may transmit an RA preamble transmission instruction or an SRS transmission instruction to the terminal apparatus.

Figure 4:
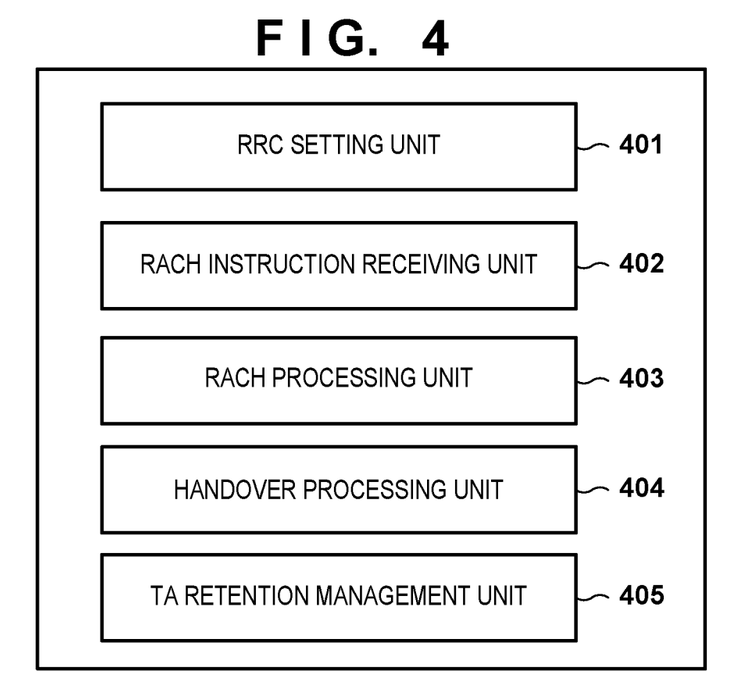
FIG. 4 is a diagram illustrating an example of the functional configuration of a terminal apparatus.

FIG. 4 illustrates an example of the functional configuration of the terminal apparatus. The terminal apparatus includes, for example, an RRC setting unit 401, a RACH instruction receiving unit 402, a RACH processing unit 403, a handover processing unit 404, and a TA retention management unit 405. Note that in FIG. 4, only the functions relating specifically to the present embodiment are illustrated, and various other functions that a terminal apparatus may include are omitted from the diagram. For example, the terminal apparatus naturally includes other functions typically included in a terminal apparatus compliant with 5G or a successive standard. Also, the functional blocks in FIG. 4 are schematically illustrated, and the functional blocks may be integrally formed or may be subdivided when implemented. Also, the functions in FIG. 4 may be implemented by the processor 201 executing a program stored in the ROM 202 or the storage apparatus 204 or may be implemented by a processor inside the communication circuit 205 executing a predetermined piece of software, for example. Note that the processing executed by the functional units described above will not be described here, and the functions will be described here in broad terms.

The RRC setting unit 401 executes connection setting processing with the base station apparatus that is a handover destination candidate by receiving an RRC layer message from the base station apparatus that is the connection destination. Note that the RRC setting unit 401 holds the setting for the currently connected base station apparatus in parallel with the setting for the base station apparatus that is the handover destination candidate. The RACH instruction receiving unit 402 receives an RA preamble transmission instruction from the currently connected base station apparatus. The RA preamble transmission instruction may be performed via a PDCCH order. Note that the RACH instruction receiving unit 402, for example, may also receive an RA preamble retransmission instruction, an RA preamble transmission stop instruction, and the like. In response to the RACH instruction receiving unit 402 receiving an instruction, the RACH processing unit 403 transmits the RA preamble to the base station apparatus that is a handover destination candidate. Here, information of a sequence for generating the RA preamble and radio resources for reception of the RA preamble in the base station apparatus that is a handover destination candidate may be received from the currently connected base station apparatus via the RACH instruction receiving unit 402. Note that the information of the sequences and radio resources may be obtained from the system information delivered by the base station apparatus that is a handover destination candidate. The handover processing unit 404 changes the connection destination base station apparatus in response to receiving a handover command (Cell switch command) from the currently connected base station apparatus. Note that the terminal apparatus does not need to execute special setting processing with the base station apparatus that is a handover destination candidate due to the setting processing by the RRC setting unit 401 and the RACH processing by the RACH processing unit 403. Thus, for example, in a case where allocation of uplink radio resources in the base station apparatus that is a handover destination candidate is notified via the received command, the terminal apparatus can transmit an uplink signal immediately using the radio resources.

In a case where the TA value for the base station apparatus that is a handover destination candidate is obtained, the TA retention management unit 405 performs TA value retention and management. For example, in response to the TA value effective period ending, the TA retention management unit 405 may perform retransmission of the RA preamble and update the TA value without receiving an instruction from the currently connected base station apparatus or the base station apparatus that is a handover destination candidate. Also, via an instruction from the currently connected base station apparatus or the base station apparatus that is a handover destination candidate, the TA retention management unit 405 may transmit the RA preamble or a predetermined signal such as an SRS for the base station apparatus that is a handover destination candidate and update the TA value. Also, in a case where information indicating to end TA value retention is received from the currently connected base station apparatus, the TA retention management unit 405 ends retention of the TA value. Here, the TA retention management unit 405 may immediately discard the TA value for which retention has ended, or it may be retained for the effective period. Also, after handover is performed, the TA retention management unit 405 may retain and manage the TA value for the base station apparatus that is the handover source. In other words, the TA retention management unit 405 may retain the TA value of the currently connected base station apparatus as the TA value of the base station apparatus that is a handover destination candidate after handover from the base station apparatus to another base station apparatus is performed.

Processing Flow

Figure 5:
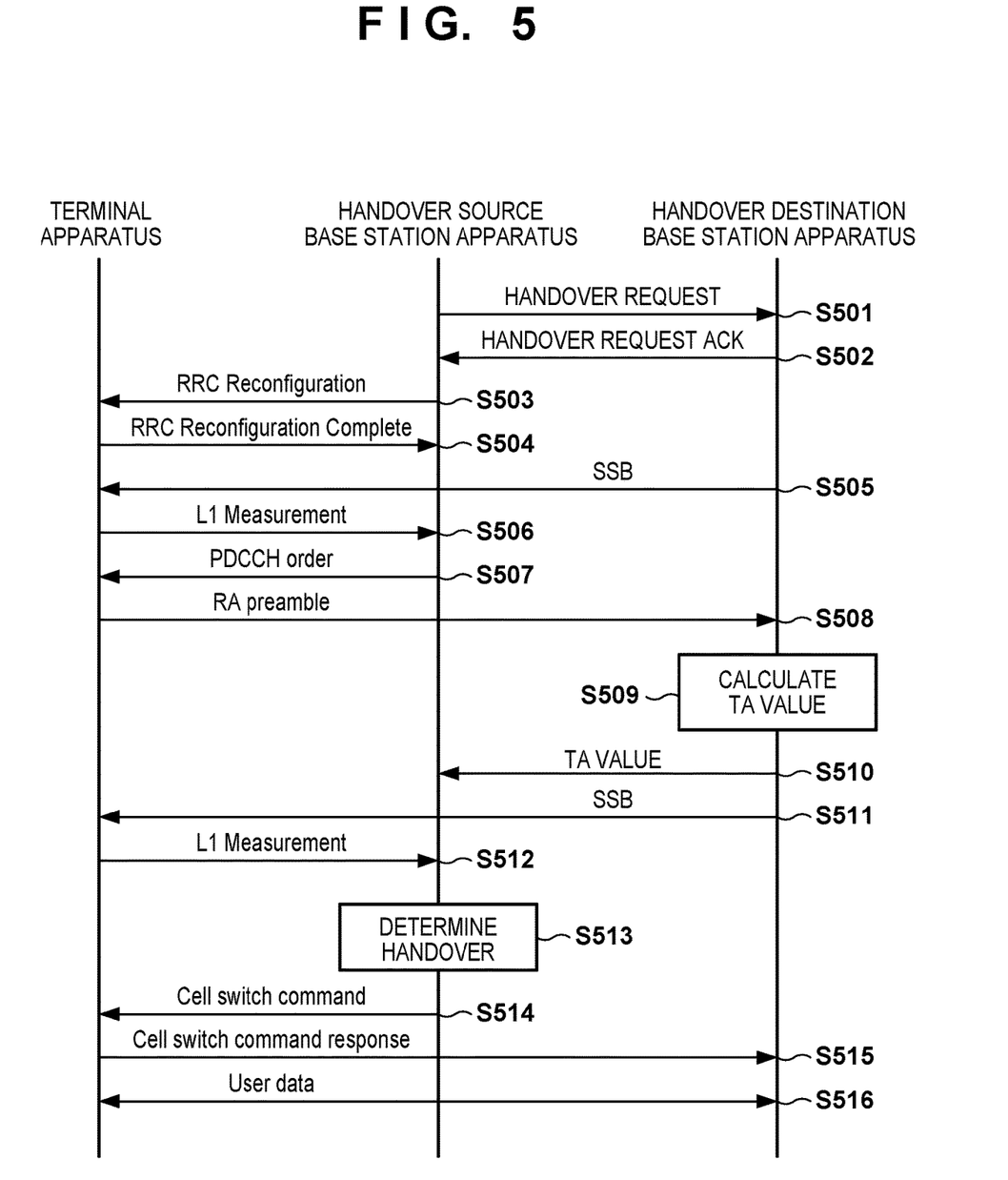
FIG. 5 is a diagram illustrating an example of the flow of processing executed by the wireless communication system.

FIG. 5 illustrates an example of the flow of processing executed by the wireless communication system according to the present embodiment. Note that the example illustrated in FIG. 5 is an example, and modifications such as those described above can be applied to each process. For example, in the example illustrated in FIG. 5, the terminal apparatus is notified of a sequence unique to the terminal apparatus as a sequence for generating the RA preamble to be transmitted to the base station apparatus that is a handover destination candidate. However, this may be substituted with the process described above in which a group of sequences that can be used by a plurality of terminal apparatuses are notified. Note that in the example of FIG. 5, a connection between a first base station apparatus that is the handover source and the terminal apparatus is established.

First, the first base station apparatus transmits a HANDOVER REQUEST message to a second base station apparatus forming the adjacent cell that is a handover destination candidate of the terminal apparatus (S501). When the second base station apparatus receives the message, the second base station apparatus sends back a HANDOVER REQUEST ACK message including information of a communication parameter to be used when the terminal apparatus connects and the like to the first base station apparatus (S502). Then, the first base station apparatus notifies the terminal apparatus of an RRC Reconfiguration message including the communication parameter and the like notified by the second base station apparatus (S503). When the terminal apparatus receives the message, the terminal apparatus transmits an RRC Reconfiguration Complete message to the first base station apparatus and ends the setting processing using an RRC layer message. Via this processing, the terminal apparatus does not need to execute RRC layer setting processing after a handover instruction has been sent from the first base station apparatus to the second base station apparatus. Note that in the example of FIG. 5, only one base station apparatus that is a handover destination candidate is illustrated. However, similar setting processing may be executed for a plurality of candidate base station apparatuses.

Thereafter, the terminal apparatus measures the wireless signal (for example, SSB) transmitted from the second base station apparatus that is a handover destination candidate (S505) and notifies the first base station apparatus of the measurement result (S506). Here, the first base station apparatus may notify the second base station apparatus of the measurement result. In this case, the second base station apparatus can roughly identify the beams to use in communication with the terminal apparatus. The second base station apparatus may transmit a CSI-RS and cause the terminal apparatus to perform a measurement in order to form a further detailed beam. In this case, the second base station apparatus may transmit CSI-RS setting information to the first base station apparatus to be transferred to the terminal apparatus. The terminal apparatus measures the CSI-RS on the basis of the setting information and reports the measurement result to the currently connected first base station apparatus. Then, the first base station apparatus transfers the measurement result to the second base station apparatus. Accordingly, immediately after the terminal apparatus performs handover to the second base station apparatus, the second base station apparatus can transmit a downlink signal using a detailed beam.

Next, the first base station apparatus instructs the terminal apparatus to transmit the RA preamble to the second base station apparatus (S507). Here, the instruction may include the sequence to be used by the terminal apparatus to generate the RA preamble and information specifying the radio resources to transmit the RA preamble. Note that the radio resources to transmit the RA preamble, for example, may be identified on the basis of the system information of the second base station apparatus transmitted from the second base station apparatus and measured by the terminal apparatus. In other words, the information may not be obtained from the currently connected base station apparatus. Also, the sequence to be used when generating the RA preamble may be identified in advance. For example, in S503, the terminal apparatus may be notified of the information of the sequence. The terminal apparatus transmits the RA preamble to the second base station apparatus according to an instruction (S508). At this time, the first base station apparatus may notify the second base station apparatus that the terminal apparatus will be transmitting the RA preamble. At this time, the first base station apparatus may notify the second base station apparatus of the information of the sequence to be used by the terminal apparatus to generate the RA preamble. Accordingly, the second base station apparatus can detect the RA preamble to be transmitted by the terminal apparatus. Note that this is an example, and the HANDOVER REQUEST of S501 may be used to implicitly notify that the terminal apparatus will be transmitting the RA preamble, for example. Also, in this case, the sequence to be used by the terminal apparatus to generate the RA preamble may be specified by the second base station apparatus using the HANDOVER REQUEST ACK of S502. Note that this is an example, and the information of the sequence to be used by the terminal apparatus to generate the RA preamble and the like may be shared between the first base station apparatus and the second base station apparatus via another message. The second base station apparatus calculates the TA value on the basis of the RA preamble transmitted from the terminal apparatus (S509). The second base station apparatus may notify the first base station apparatus of the calculated TA value (S510). Note that the TA value may be managed by one of or both of the first base station apparatus and the second base station apparatus. Also, in response to the first base station apparatus determining to perform handover of the terminal apparatus, for example, the first base station apparatus may be notified of the TA value from the second base station apparatus. For example, the first base station apparatus may notify the second base station apparatus of the handover, and as a response to this notification, the TA value may be sent from the second base station apparatus to the first base station apparatus.

At this point in time, the terminal apparatus has not performed handover to the second base station apparatus. In this state, the terminal apparatus continuously performs measurement of the wireless signal from the second base station apparatus (S511) and notifies the currently connected first base station apparatus of the measurement result (S512). The first base station apparatus may determine to perform handover according to the measurement result (S513). For example, in a case where a predetermined condition is satisfied, such as when the wireless quality of the signal from the second base station apparatus is higher than the wireless quality of the signal from the first base station apparatus by a predetermined level or greater, the first base station apparatus may determine to cause the terminal apparatus to handover to the second base station apparatus. The first base station apparatus transmits a command instructing the terminal apparatus to perform handover according to this determination (S514). The command may include the TA value obtained in S510 and information of the uplink resource for transmitting a signal immediately after handover. Note that the TA value may be transferred to the terminal apparatus immediately after the first base station apparatus is notified in S510. In this case, the command does not need to include the TA value. Also, the first base station apparatus may identify the information of the uplink resource by querying the second base station apparatus in advance. Also, the first base station apparatus may instruct the terminal apparatus to use reserve predetermined radio resources that can be used by the second base station apparatus without sending a query. When the terminal apparatus receives the command, the terminal apparatus may change the connection destination base station apparatus to the second base station apparatus and may transmit a response signal to the command to the second base station apparatus using the resources specified by the received command (S515). Accordingly, the second base station apparatus can confirm that the terminal apparatus has performed handover to the second base station apparatus, and thereafter, user data may be communicated between the terminal apparatus and the second base station apparatus (S516). Note that the terminal apparatus may transmit the user data to the second base station apparatus in addition to or instead of the response signal of S515.

In this manner, according to the present embodiment, the base station apparatus that is the handover source determines to cause the terminal apparatus to actually perform a handover to another base station apparatus. Thereafter, the amount of time taken before the terminal apparatus can start communicating user data with the post-handover base station apparatus can be greatly reduced. This contributes to Goal 9 of the sustainable development goals (SDGs) initiated by the United Nations of "building resilient infrastructure, promoting sustainable industrialization, and foster innovation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus comprising:
   a receiving unit configured to receive, from a currently connected base station apparatus, a setting of a radio resource control (RRC) layer for another base station apparatus that is a destination candidate for a handover by the terminal apparatus from the base station apparatus and to receive, from the base station apparatus, a physical downlink control channel (PDCCH) order instructing the terminal apparatus to transmit a random access preamble to the other base station apparatus without handover to the other base station apparatus being performed;
   a transmitting unit configured to transmit the random access preamble to the other base station apparatus according to the instruction; and
   a performing unit configured to perform handover to the other base station apparatus in a case where a command instructing for a handover to the other base station apparatus is received from the base station apparatus,
   wherein the receiving unit receives, from the base station apparatus, a sequence unique to the terminal apparatus used by the terminal apparatus when generating the random access preamble and information for identifying radio resources that can be used when transmitting the random access preamble, and
   the transmitting unit generates the random access preamble using the sequence unique to the terminal apparatus and transmits the random access preamble using radio resources identified via the information, and in a case where a signal requesting for retransmission of the random access preamble is received from the base station apparatus, the transmitting unit retransmits the random access preamble, and in a case where a signal requesting for retransmission of the random access preamble is not received from the base station apparatus or the other base station apparatus, the transmitting unit does not retransmit the random access preamble.

2. The terminal apparatus according to claim 1, wherein the receiving unit receives an instruction to transmit the random access preamble to a plurality of the other base station apparatuses via one PDCCH.

3. The terminal apparatus according to claim 1, wherein the receiving unit receives, from the base station apparatus or the other base station apparatus, a value (TA value) of a timing advance identified by the other base station apparatus on a basis of the random access preamble transmitted by the terminal apparatus.

4. The terminal apparatus according to claim 3, further comprising:

a retaining unit configured to retain the TA value, wherein the transmitting unit transmits a predetermined uplink signal to the other base station apparatus in response to an effective period of the TA value ending or an update period of the TA value arriving.

5. The terminal apparatus according to claim 4, wherein in a case where the transmitting unit is instructed to transmit the random access preamble from the base station apparatus in response to the effective period of the TA value ending or the update period of the TA value arriving, the transmitting unit transmits the random access preamble to the other base station apparatus as the predetermined uplink signal.

6. The terminal apparatus according to claim 4, wherein the transmitting unit transmits, at predetermined periods or in response to an instruction to transmit a sounding reference signal (SRS) from the other base station apparatus, the SRS to the other base station apparatus at a transmission timing determined using the TA value as the predetermined uplink signal.

7. The terminal apparatus according to claim 4, wherein the retaining unit ends retention of the TA value in response to a wireless quality between the terminal apparatus and the other base station apparatus being equal to or less than a predetermined level.

8. The terminal apparatus according to claim 1, wherein the transmitting unit repeatedly transmits the random access preamble at predetermined periods until a transmission stop instruction for the random access preamble is received from the base station apparatus and stops transmitting the random access preamble in response to the transmission stop instruction being received.

9. The terminal apparatus according to claim 1, wherein the receiving unit receives, from the base station apparatus, a group of sequences that can be used when generating the random access preamble to be transmitted to the other base station apparatus, and the transmitting unit uses one sequence selected from the group of sequences to generate the random access preamble and transmits the random access preamble to the other base station apparatus.

10. The terminal apparatus according to claim 9, wherein the receiving unit receives a response to the random access preamble from the base station apparatus or the other random access preamble, the transmitting unit transmits a first message including identification information of the terminal apparatus to the other base station apparatus in a case where the response is received, and the receiving unit receives a second message including identification information of the terminal apparatus with respect to the first message from the base station apparatus or the other base station apparatus.

11. The terminal apparatus according to claim 10, wherein the receiving unit receives, from the base station apparatus, a notification of at least one of a timing for transmitting, from the other base station apparatus, the response to the random access preamble by the terminal apparatus and a timing for transmitting, from the other base station apparatus, the second message.

12. The terminal apparatus according to claim 1, wherein the transmitting unit repeatedly retransmits the random access preamble at predetermined periods in response to an instruction to transmit the random access preamble, the receiving unit receives a transmission stop for the random access preamble from the base station apparatus, and the transmitting unit stops transmitting the random access preamble in response to receiving the transmission stop instruction.

13. A control method executed by a terminal apparatus comprising:

receiving, from a currently connected base station apparatus, a setting of a radio resource control (RRC) layer for another base station apparatus that is a destination candidate for a handover by the terminal apparatus from the base station apparatus and receiving, from the base station apparatus, a physical downlink control channel (PDCCH) order instructing the terminal apparatus to transmit a random access preamble to the other base station apparatus without handover to the other base station apparatus being performed;

transmitting the random access preamble to the other base station apparatus according to the instruction; and performing handover to the other base station apparatus in a case where a command instructing for a handover to the other base station apparatus is received from the base station apparatus, wherein in the receiving, a sequence unique to the terminal apparatus used by the terminal apparatus when generating the random access preamble and information for identifying radio resources that can be used when transmitting the random access preamble are received from the base station apparatus, and in the transmitting, the random access preamble is generated using the sequence unique to the terminal apparatus and the random access preamble is transmitted using radio resources identified via the information, and in a case where a signal requesting for retransmission of the random access preamble is received from the base station apparatus, the random access preamble is retransmitted, and in a case where a signal requesting for retransmission of the random access preamble is not received from the base station apparatus or the other base station apparatus, the random access preamble is not retransmitted.

* * * * *